United States Patent
Kraus et al.

(10) Patent No.: US 8,586,185 B2
(45) Date of Patent: Nov. 19, 2013

(54) AQUEOUS POLYURETHANE-POLYURETHANE UREA DISPERSIONS, ADHESIVES CONTAINING THE SAME, PROCESSES FOR THE PREPARATION THEREOF AND USES THEREFORE

(75) Inventors: Harald Kraus, Leverkusen (DE); Wolfgang Henning, Kreuzau/Untermaubach (DE); Wolfgang Arndt, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 451 days.

(21) Appl. No.: 12/741,887

(22) PCT Filed: Oct. 24, 2008

(86) PCT No.: PCT/EP2008/009006
§ 371 (c)(1),
(2), (4) Date: May 26, 2010

(87) PCT Pub. No.: WO2009/059697
PCT Pub. Date: May 14, 2009

(65) Prior Publication Data
US 2010/0266853 A1    Oct. 21, 2010

(30) Foreign Application Priority Data

Nov. 7, 2007 (DE) .......... 10 2007 052 966
Aug. 13, 2008 (DE) .......... 10 2008 038 899

(51) Int. Cl.
B32B 27/40 (2006.01)
C08L 75/04 (2006.01)
C09J 175/04 (2006.01)

(52) U.S. Cl.
USPC ............ 428/423.1; 428/425.1; 524/591; 528/44; 528/61

(58) Field of Classification Search
USPC .......... 428/425.1, 423.1; 524/591; 528/44, 61
See application file for complete search history.

(56) References Cited

U.S. PATENT DOCUMENTS

| | | | |
|---|---|---|---|
| 3,905,929 A | 9/1975 | Noll | |
| 3,920,598 A | 11/1975 | Reiff et al. | |
| 4,092,286 A | 5/1978 | Noll et al. | |
| 4,237,264 A | 12/1980 | Noll et al. | |
| 4,433,095 A | 2/1984 | Hombach et al. | |
| 4,663,377 A | 5/1987 | Hombach et al. | |
| 4,870,129 A | 9/1989 | Henning et al. | |
| 5,389,718 A * | 2/1995 | Potter et al. | 524/591 |
| 5,432,228 A * | 7/1995 | Hilken et al. | 524/591 |
| 5,470,899 A | 11/1995 | Gulbins et al. | |
| 6,482,885 B1 * | 11/2002 | Muller et al. | 524/501 |
| 6,616,797 B1 | 9/2003 | Licht et al. | |
| 6,767,958 B2 | 7/2004 | Laas et al. | |
| 6,787,596 B1 | 9/2004 | Maier et al. | |
| 6,875,810 B2 | 4/2005 | Kitada et al. | |
| 2003/0032720 A1 | 2/2003 | Haeberle et al. | |
| 2005/0256261 A1 | 11/2005 | Arndt et al. | |
| 2009/0056873 A1 | 3/2009 | Schumacher et al. | |
| 2010/0266854 A1 | 10/2010 | Kraus et al. | |

FOREIGN PATENT DOCUMENTS

| | | |
|---|---|---|
| CA | 1328701 C | 4/1994 |
| DE | 2314512 A1 | 10/1974 |
| DE | 2314513 A1 | 10/1974 |
| DE | 2551094 A1 | 5/1977 |
| DE | 3112117 A1 | 10/1982 |
| DE | 19914884 A1 | 10/2000 |
| DE | 10024624 A1 | 11/2001 |
| DE | 10152405 A1 | 5/2002 |
| DE | 102004023768 A1 | 12/2005 |
| EP | 0206059 A2 | 12/1986 |
| EP | 0304718 A2 | 3/1989 |
| WO | WO-2007/082826 A2 | 7/2007 |

* cited by examiner

Primary Examiner — Thao T. Tran
(74) Attorney, Agent, or Firm — Novak Druce Connolly Bove + Quigg LLP

(57) ABSTRACT

Aqueous polyurethane-polyurethane urea dispersions comprising a reaction product of: (i) an NCO prepolymer prepared from; (A) one or more di- or higher-functional polyols having a mean molecular weight of 400 to 5000 daltons, (B) optionally one or more di- or higher-functional polyol components having a molecular weight of from 62 to 399 daltons, (C) one or more compounds which are monofunctional within the scope of the isocyanate polyaddition reaction and have an ethylene oxide content of at least 50 wt. % and a molecular weight of at least 400 daltons, and (D) one or more di- or poly-isocyanate components; and (ii) a mixture (E) of primary and/or secondary monoamino compounds (E1) and primary and/or secondary diamino compounds (E2); wherein at least one of the amino compounds of the mixture (E) has a functional group selected from sulfonates and carboxylates; wherein mixture (E) has a mean amino functionality of 1.65 to 1.95; and wherein the equivalent ratio of NCO groups in the NCO prepolymer to the total amount of isocyanate-reactive groups of the mixture (E) is 1.04 to 1.9; to processes for their preparation and to use thereof in the production of adhesive composites.

13 Claims, No Drawings

AQUEOUS POLYURETHANE-POLYURETHANE UREA DISPERSIONS, ADHESIVES CONTAINING THE SAME, PROCESSES FOR THE PREPARATION THEREOF AND USES THEREFORE

CROSS-REFERENCE TO RELATED APPLICATIONS

This application is a national stage application, under 35 U.S.C. §371, of International Application No. PCT/EP2008/009006, filed Oct. 24, 2008, which designated the U.S. and claims priority of German Patent Application 102007052966.1, filed Nov. 7, 2007, and German Patent Application 102008038899.8, filed Aug. 13, 2008.

BACKGROUND OF THE INVENTION

The invention relates to aqueous dispersion adhesives based on aqueous polyurethane-polyurethane urea dispersions, to a process for their preparation and to the use of the dispersion adhesives in the production of adhesive composites.

The preparation of aqueous polyurethane-polyurethane urea dispersions is known. When such dispersions are used as adhesives for the bonding of substrates, the heat activation method is frequently employed. In this method, the dispersion is applied to the substrate and, when the water has evaporated completely, the adhesive layer is activated by heating, for example with an infra-red radiator, and brought into a sticky state. The temperature at which the adhesive film becomes tacky is referred to as the activation temperature. As low an activation temperature as possible is generally desired, because a disadvantageously high outlay in terms of energy is required at high activation temperatures and manual joining becomes difficult to impossible.

Adhesives based on aqueous polyurethane-polyurethane urea dispersions, which are suitable for application of the heat activation method, are described in U.S. Pat. No. 4,870,129. According to that specification, it is possible by using specific mixtures of diisocyanates to obtain aqueous polyurethane-polyurethane urea dispersions by the acetone process, and the films obtainable therefrom can readily be activated at 40° to 80° C.

Likewise, EP-A 0 304 718 describes the preparation of aqueous polyurethane-polyurethane urea dispersions which permit the production of films which can readily be activated. This is achieved by the use of specific amino compounds as chain extenders. The amino compounds are primary and/or secondary monoamino compounds, optionally in admixture with primary and/or secondary diamino compounds having a mean amino functionality of from 1 to 1.9. The equivalent ratio of NCO groups in the NCO prepolymer to the total amount of hydrogen atoms active towards isocyanates is from 0.5:1 to 0.98:1. Mixtures of diamino and monoamino compounds are preferably used. DE-A 2551094 describes polyurethanes which are dispersible in water and have lateral polyalkylene oxide-polyether chains and ionic groups (sulfonate, carboxylate or ammonium groups) and which can be used inter alia also as adhesives.

A fundamental disadvantage of these dispersion adhesives described in the prior art is their inadequate initial heat resistance. In addition, they exhibit inadequate final heat resistance in the case of one-component adhesive bonding, one-component within the scope of the present invention meaning that an additional polyisocyanate compound is not added as crosslinker component prior to application.

A further method of preparing aqueous polyurethane-polyurethane urea dispersions which are suitable as an adhesive in particular according to the heat activation method is disclosed in DE-A 101 52 405. In this specification, aqueous polyurethane-polyurethane urea dispersions can be obtained by using specific polyester polyols comprising aromatic metal sulfonate groups. Films produced therefrom by removing the water can readily be activated even at 50 to 60° C. However, these polyesters comprising aromatic metal sulfonate groups can be obtained only with difficulty or are very expensive owing to the dicarboxylic acids containing metal sulfonate or sulfonic acid groups which are necessarily to be used as raw materials.

DE-A 10 2004 023 768 discloses a further method of preparing polyurethane-polyurethane urea dispersions which are suitable as adhesives having good initial heat resistance. However, the content of up to 7.5 wt. % of an external emulsifier adversely affects the possible uses of these adhesives, because they cause high hydrophilicity and sensitivity of the products to water. In addition, the adhesion and bonding force can be adversely affected by migration effects of the emulsifier, which is not chemically bonded.

BRIEF SUMMARY OF THE INVENTION

Accordingly, the object of the present invention was to provide dispersion adhesives based on polyurethane-polyurethane urea dispersions prepared without using an emulsifier, from which there can be obtained, by evaporating the water or removing it in another manner (e.g. absorption of the water by the substrate which is itself absorbent or by an absorbent auxiliary agent), films which have improved initial heat resistance and improved, high final heat resistance as compared with the prior art.

Surprisingly, it has now been found that the aqueous polyurethane-polyurea dispersion described hereinbelow, which is prepared without need of using an emulsifier, is suitable as an adhesive raw material, and that the thermally activatable films obtained therefrom by evaporating the water or removing it in another manner have improved initial heat resistance and an improved, high heat resistance as compared with the prior art. The dispersion according to the invention is stable as such and does not require any external emulsifiers.

The present invention accordingly provides aqueous polyurethane-polyurethane urea dispersions based on A) one or more di- or higher-functional polyol(s) having a mean molecular weight of from 400 to 5000 daltons,
B) optionally one or more di- or higher-functional polyol component(s) having a molecular weight of from 62 to 399 daltons,
C) one or more compound(s) which are monofunctional within the scope of the isocyanate polyaddition reaction and have an ethylene oxide content of at least 50 wt. % and a molecular weight of at least 400 daltons,
D) one or more di- or poly-isocyanate component(s), and
E) a mixture E) of primary and/or secondary monoamino compounds E1) and primary and/or secondary diamino compounds E2), characterised in that at least one of components E1) and/or E2) carries sulfonate and/or carboxylate groups, and the mean amino functionality of the mixture E) is from 1.65 to 1.98, and the equivalent ratio of NCO groups in the NCO prepolymer to the total amount of isocyanate-reactive amino and hydroxyl groups of the mixture E) is from 1.04 to 1.9.

DETAILED DESCRIPTION OF THE INVENTION

Suitable di- or higher-functional polyols A) are compounds having at least two hydrogen atoms that are reactive towards isocyanates and a mean molecular weight of from 400 to 5000 daltons. Examples of suitable building blocks are polyethers, polyesters, polycarbonates, polylactones or polyamides. Preferred polyols A) have from 2 to 4, particularly preferably from 2 to 3, hydroxyl groups. Mixtures of different compounds of this type are also suitable.

There come into consideration as polyester polyols in particular linear polyester diols or also weakly branched polyester polyols, as can be prepared in known manner from aliphatic, cycloaliphatic or aromatic di- or poly-carboxylic acids, such as, for example, succinic acid, methylsuccinic acid, glutaric acid, adipic acid, pimelic acid, suberic acid, azelaic acid, sebacic acid, nonanedicarboxylic acid, decanedicarboxylic acid, terephthalic acid, isophthalic acid, o-phthalic acid, tetrahydrophthalic acid, hexahydrophthalic acid, cyclohexanedicarboxylic acid, maleic acid, fumaric acid, malonic acid or trimellitic acid, as well as acid anhydrides, such as o-phthalic anhydride, trimellitic anhydride or succinic anhydride or mixtures thereof with polyhydric alcohols, such as, for example, ethanediol, di-, tri-, tetra-ethylene glycol, 1,2-propanediol, di-, tri-, tetra-propylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, 1,12-dodecanediol or mixtures thereof, optionally with the concomitant use of higher-functional polyols, such as trimethylolpropane, glycerol or pentaerythritol. Suitable polyhydric alcohols for the preparation of the polyester polyols are, of course, also cycloaliphatic and/or aromatic di- and poly-hydroxyl compounds. Instead of the free polycarboxylic acid it is also possible to use for the preparation of the polyesters the corresponding polycarboxylic anhydrides or corresponding polycarboxylic acid esters of lower alcohols or mixtures thereof.

The polyester polyols can, of course, also be homopolymers or mixed polymers of lactones, which are preferably obtained by adding lactones or lactone mixtures, such as butyrolactone, ε-caprolactone and/or methyl-ε-caprolactone, to the suitable di- and/or higher-functional starter molecules, such as, for example, the low molecular weight polyhydric alcohols mentioned above as chain-extension components for polyester polyols. The corresponding polymers of ε-caprolactone are preferred.

Particular preference is given to largely linear polyester polyols which contain adipic acid and 1,4-butanediol and/or 1,6-hexanediol and/or 2,2-dimethyl-1,3-propanediol as building blocks.

Polycarbonates containing hydroxyl groups also come into consideration as polyhydroxyl components, for example those which can be prepared by reacting diols such as 1,4-butanediol and/or 1,6-hexanediol with diaryl carbonates, such as, for example, diphenyl carbonate, dialkyl carbonates, such as, for example, dimethyl carbonate, or phosgene. The hydrolytic stability of the dispersion adhesives according to the invention can be improved by the at least partial use of polycarbonates containing hydroxyl groups.

Preference is given to polycarbonates that have been prepared by reacting 1,6-hexanediol with dimethyl carbonate.

Suitable as polyether polyols are, for example, the polyaddition products of the styrene oxides, of ethylene oxide, propylene oxide, tetrahydrofuran, butylene oxide, epichlorohydrin, as well as mixed addition and graft products thereof, as well as polyether polyols obtained by condensation of polyhydric alcohols or mixtures thereof and polyether polyols obtained by alkoxylation of polyhydric alcohols, amines and amino alcohols. Polyether polyols suitable as chain-extension components A) are the homopolymers, mixed polymers and graft polymers of propylene oxide and of ethylene oxide, which are obtainable by adding the mentioned epoxides to low molecular weight diols or triols, as are mentioned above as building blocks for polyester polyols, or to higher-functional low molecular weight polyols such as, for example, pentaerythritol or sugars, or to water.

Particularly preferred di- or higher-functional polyols A) are polyester polyols, polylactones or polycarbonates, the polyester polyols of the above-mentioned type are most particularly preferred.

There are suitable as the chain-extension component B) di- or higher-functional polyol components having a molecular weight of from 62 to 399 daltons, such as, for example, polyethers, polyesters, polycarbonates, polylactones or polyamides, provided they have a molecular weight of from 62 to 399 daltons.

Further suitable components are the polyhydric, in particular dihydric, alcohols mentioned under A) for the preparation of the polyester polyols, and also low molecular weight polyester diols such as, for example, adipic acid bis-(hydroxyethyl) ester, or short-chained homo- and mixed addition products of ethylene oxide or propylene oxide started with aromatic diols. Examples of aromatic diols which can be used as starters for short-chained homopolymers and mixed polymers of ethylene oxide or propylene oxide are, for example, 1,4-, 1,3-, 1,2-dihydroxybenzene or 2,2-bis-(4-hydroxyphenyl)-propane (bisphenol A).

Compounds which are monofunctional within the scope of the isocyanate polyaddition reaction and have an ethylene oxide content of at least 50 wt. % and a molecular weight of at least 400 daltons are suitable as component C). Compound C) is a hydrophilic component for the incorporation of chains, containing terminal, hydrophilic ethylene oxide units, of formula (I)

H—Y'—X—Y—R     (I)

in which

R represents a monovalent hydrocarbon radical having from 1 to 12 carbon atoms, preferably an unsubstituted alkyl radical having from 1 to 4 carbon atoms, X represents a polyalkylene oxide chain having from 5 to 90, preferably from 20 to 70, chain members which consist of at least 51%, preferably at least 65%, of ethylene oxide units and which can consist, in addition to ethylene oxide units, of propylene oxide, butylene oxide or styrene oxide units, propylene oxide units being preferred among the last-mentioned units, and Y/Y' represents oxygen or —NR'—, wherein R' corresponds to R or hydrogen in respect of its definition.

The preparation of the monofunctional, hydrophilic components is carried out analogously to the method described in DE-A 23 14 512 or DE-A 23 14 513 or in U.S. Pat. Nos. 3,905,929 or 3,920,598 by alkoxylation of a monofunctional starter, such as, for example, methanol, ethanol, isopropanol, n-butanol or N-methyl-butylamine, using ethylene oxide and optionally a further alkylene oxide such as, for example, propylene oxide.

Preferred components C) are the mixed polymers of ethylene oxide with propylene oxide in which the amount by weight of ethylene oxide is greater than 50%, particularly preferably from 65 to 89%. In a preferred embodiment, compounds having a molecular weight of at least 400 daltons, preferably from 1000 to 4500 daltons, particularly preferably from 1500 to 3500 daltons and most particularly preferably from 2000 to 2500 daltons, are used as the components C).

Suitable as components D) are any organic compounds containing at least two free isocyanate groups per molecule. Preference is given to the use of diisocyanates $Y(NCO)_2$, wherein Y represents a divalent aliphatic hydrocarbon radical having from 4 to 12 carbon atoms, a divalent cycloaliphatic hydrocarbon radical having from 6 to 15 carbon atoms, a divalent aromatic hydrocarbon radical having from 6 to 15 carbon atoms or a divalent araliphatic hydrocarbon radical having from 7 to 15 carbon atoms. Examples of such diisocyanates which are preferably to be used are tetramethylene diisocyanate, methylpentamethylene diisocyanate, hexamethylene diisocyanate, dodecamethylene diisocyanate, 1,4-diisocyanato-cyclohexane, 1-isocyanato-3,3,5-trimethyl-5-isocyanatomethyl-cyclohexane, 4,4'-diisocyanato-dicyclohexyl-methane, 4,4'-diisocyanato-2,2-dicyclohexylpropane, 1,4-diisocyanatobenzene, 2,4-diisocyanatotoluene, 2,6-diisocyanatotoluene, 4,4'-diisocyanato-diphenylmethane, 2,2'- and 2,4'-diisocyanatodiphenylmethane, tetramethylxylylene diisocyanate, p-xylylene diisocyanate, p-isopropylidene diisocyanate, as well as mixtures consisting of these compounds.

It is, of course, also possible to use, proportionately, the higher-functional polyisocyanates known per se in polyurethane chemistry or also modified polyisocyanates known per se, for example polyisocyanates containing carbodiimide groups, allophanate groups, isocyanurate groups, urethane groups and/or biuret groups.

Preferred diisocyanates D) are aliphatic and araliphatic diisocyanates, such as hexamethylene diisocyanate, 1,4-diisocyanato-cyclohexane, 1-isocyanato-3,3,5-trimethyl-5-isocyanatomethyl-cyclohexane, 4,4'-diisocyanato-dicyclohexyl-methane or 4,4'-diisocyanato-2,2-dicyclohexylpropane, as well as mixtures consisting of these compounds.

Particularly preferred components D) are mixtures of hexamethylene diisocyanate and 1-isocyanato-3,3,5-trimethyl-5-isocyanatomethyl-cyclohexane.

The polymer on which the dispersions according to the invention are based contains ionic or potentially ionic groups for hydrophilisation, which groups can be either cationic or anionic in nature. Sulfonate and carboxylate groups are preferred. Alternatively, groups that can be converted into the above-mentioned ionic groups by salt formation (potentially ionic groups) can also be used. The hydrophilic groups are introduced into the polymer via components E1) and/or E2).

Suitable as the chain-extension component E) is a mixture of primary and/or secondary monoamino compounds E1) and primary and/or secondary diamino compounds E2), wherein at least one of components E1) and/or E2) carries sulfonic acid and/or carboxyl groups.

Examples of E1) are aliphatic and/or alicyclic primary and/or secondary monoamines, such as ethylamine, diethylamine, the isomeric propyl- and butyl-amines, higher linear-aliphatic monoamines and cycloaliphatic monoamines such as cyclohexylamine. Further examples of E1) are amino alcohols, that is to say compounds that contain amino and hydroxyl groups in a molecule, such as, for example, ethanolamine, N-methylethanolamine, diethanolamine and 2-propanolamine. Further examples of E1) are monoamino compounds that additionally carry sulfonic acid and/or carboxyl groups, such as, for example, taurine, glycine or alanine. It is, of course, also possible to use mixtures of a plurality of monoamino compounds E1).

Preferred chain-extension components E1) are diethylamine, ethanolamine or diethanolamine. Particularly preferred chain-extension components E1) are ethanolamine or diethanolamine.

Examples of E2) are 1,2-ethanediamine, 1,6-hexamethylenediamine, 1-amino-3,3,5-trimethyl-5-aminomethyl-cyclohexane (isophoronediamine), piperazine, 1,4-diaminocyclohexane or bis-(4-aminocyclohexyl)-methane. Also suitable are adipic acid dihydrazide, hydrazine or hydrazine hydrate. Polyamines such as diethylenetriamine can also be used as the chain-extension component E2) instead of a diamino compound.

Further examples of E2) are amino alcohols, that is to say compounds that contain amino and hydroxyl groups in a molecule, such as, for example, 1,3-diamino-2-propanol, N-(2-hydroxyethyl)-ethylenediamine or N,N-bis(2-hydroxyethyl)-ethylenediamine.

Compounds E2) which are also suitable are diamino compounds that additionally carry sulfonate and/or carboxylate groups, such as, for example, the sodium or potassium salts of N-(2-aminoethyl)-2-aminoethanesulfonic acid, of N-(3-aminopropyl)-2-aminoethane-sulfonic acid, of N-(3-aminopropyl)-3-aminopropanesulfonic acid, of N-(2-aminoethyl)-3-aminopropanesulfonic acid or of the analogous carboxylic acids. It is also possible to use mixtures of a plurality of diamino compounds E2).

Preferred chain-extension components E2) are 1,2-ethanediamine, 1,6-hexamethylenediamine, 1-amino-3,3,5-trimethyl-5-aminomethyl-cyclohexane (isophoronediamine), piperazine, N-(2-hydroxyethyl)-ethylenediamine, N,N-bis(2-hydroxyethyl)-ethylenediamine, the sodium salt of N-(2-aminoethyl)-2-aminoethane-sulfonic acid or the sodium salt of N-(2-aminoethyl)-2-aminoethanecarboxylic acid.

Particularly preferred chain-extension components E2) are N-(2-hydroxyethyl)-ethylenediamine or the sodium salt of N-(2-aminoethyl)-2-aminoethanesulfonic acid.

The mean amino functionality of the mixture E) is from 1.65 to 1.98, preferably from 1.75 to 1.98, particularly preferably from 1.78 to 1.95.

The equivalent ratio of NCO groups in the NCO prepolymer to the total amount of amino and hydroxyl groups in the mixture E) that are reactive towards isocyanate is from 1.04 to 1.9, preferably from 1.08 to 1.85, most particularly preferably from 1.11 to 1.8.

The mixture E) preferably contains monoamino compounds E1), diamino compounds E2) having hydroxyl groups, and diamino compounds E2) having sulfonate or carboxylate groups. Particularly preferably, the mixture E) contains monoamino alcohols E1), diamino alcohols E2) and diamino compounds E2) having sulfonate groups. Most particularly preferably, the mixture E) contains diethanolamine, N-(2-hydroxyethyl)-ethylenediamine and the sodium salt of N-(2-aminoethyl)-2-aminoethanesulfonic acid.

The content of ionic groups is from 10 to 600 mmol per kg of solid, preferably from 20 to 300 mmol, particularly preferably from 30 to 150 mmol per kg of solid.

The present invention further provides a process for the preparation of the aqueous polyurethane-polyurethane urea dispersions according to the invention, characterised in that, in a first step, some or all of components A), B), C) and D), optionally in the presence of a solvent that is miscible with water but inert towards isocyanate groups, are placed in a reactor and heated to temperatures in the range from 50 to 120° C., and then any of constituents A), B), C) or D) that were not added at the beginning of the reaction are metered in, in a second step the chain extension with the mixture E) is carried out at temperatures of from 15 to 60° C. and, before, during or after the chain extension, conversion into the aqueous phase is carried out and the solvent optionally used is removed.

The preparation of the aqueous polyurethane-polyurea dispersions according to the invention can be carried out in one or more steps in homogeneous phase or, in the case of a multi-step reaction, partially in disperse phase. When the polyaddition has been carried out partially or completely, a dispersing, emulsifying or dissolving step takes place. Following this there is optionally a further polyaddition or modification in disperse phase. All the processes known from the prior art can be used for the preparation. The acetone process is preferably used.

Suitable solvents are, for example, acetone, butanone, tetrahydrofuran, dioxane, acetonitrile, dipropylene glycol dimethyl ether and 1-methyl-2-pyrrolidone; preference is given to butanone or acetone, acetone is particularly preferred. The solvents can be added not only at the beginning of the preparation but optionally partly also later. It is possible to carry out the reaction under normal pressure or elevated pressure.

For the preparation of the prepolymer, the amounts of the individual components A) to D) that are used are such that an isocyanate number of from 1.05 to 2.5, preferably from 1.1 to 1.5, is obtained. The isocyanate content of the prepolymers is from 0.3 to 3.0%, preferably from 0.7 to 1.5%, particularly preferably from 0.9 to 1.5%.

From 50 to 96 parts by weight, preferably from 75 to 96 parts by weight, of component A), from 0 to 10 parts by weight, preferably from 0 to 5 parts by weight, of component B), from 0.1 to 10 parts by weight, preferably from 0.5 to 5 parts by weight, particularly preferably from 0.8 to 3.5 parts by weight, of component C) and from 3 to 30 parts by weight, preferably from 5 to 18 parts by weight, of component D) are used, with the proviso that the sum of the components is 100.

The reaction of components A), B) and C) with D) takes place partially or completely, but preferably completely, based on the total amount of groups reactive with isocyanates. The degree of reaction is usually monitored by following the NCO content of the reaction mixture. To this end, both spectroscopic measurements, for example infra-red or near-infra-red spectra, determinations of the refractive index, as well as chemical analyses, such as titrations of removed samples, can be carried out.

In order to accelerate the isocyanate addition reaction it is possible to use conventional catalysts such as are known to the person skilled in the art for accelerating the NCO—OH reaction. Examples are triethylamine, 1,4-diazabicyclo-[2,2,2]-octane, dibutyltin oxide, tin dioctoate or dibutyltin dilaurate, tin bis-(2-ethylhexanoate) or other organometallic compounds The chain extension with the mixture E) can be carried out before the dispersion, during the dispersion or after the dispersion. The chain extension is preferably carried out before the dispersion.

The chain extension is carried out at temperatures of from 15 to 60° C., preferably from 25 to 55° C., particularly preferably from 40 to 50° C.

The expression chain extension within the scope of the present invention also includes the reactions of the monoamino compounds E1) which, owing to their monofunctionality, act as chain terminators and accordingly result not in an increase but in a decrease in the molecular weight. This is true in particular also for the amino alcohols E1), because their hydroxyl groups do not react, or react to only a very small degree, with the isocyanate groups in the chosen temperature range.

Component E) can be added to the reaction mixture in a form diluted with organic solvents and/or with water. The aminic compounds E1) and E2) can be added in succession in any desired sequence or simultaneously by addition of a mixture.

For the purposes of preparing the dispersion according to the invention, the prepolymer, optionally with strong shear, such as, for example, vigorous stirring, is either introduced into the dispersing water or, vice versa, the dispersing water is added to the prepolymer. The chain extension can then be carried out, if it has not taken place in the homogeneous phase.

After the dispersion, the organic solvent that has optionally been used, for example acetone, is removed by distillation.

Preferably no external emulsifiers are used in the process according to the invention.

The dispersions have a solids content of from 10 to 70 wt. %, preferably from 25 to 60 wt. % and particularly preferably from 35 to 60 wt. %.

The dispersion adhesives according to the invention can be used on their own or with binders, auxiliary substances and additives known in coatings and adhesives technology, in particular emulsifiers or light stabilisers, such as UV absorbers or sterically hindered amines (HALS), also antioxidants, fillers or auxiliary agents, for example anti-settling agents, antifoams and/or wetting agents, flow agents, reactive diluents, plasticisers, catalysts, auxiliary solvents and/or thickeners and additives, such as, for example, pigments, colourings or mattifying agents. Tackifying resins (tackifiers) can also be added.

The additives can be added to the coating system according to the invention immediately before processing. However, it is also possible to add at least some of the additives before, during or after the dispersion of the binder.

The present invention also provides adhesive compositions comprising the polyurethane-polyurethane urea dispersions according to the invention and polyisocyanate compounds having at least two isocyanate groups per molecule. The crosslinkers can be added prior to use (2K processing). In this case, preference is given to polyisocyanate compounds which are emulsifiable in water. These are, for example, the compounds described in EP-A 0 206 059, DE-A 31 12 117 or DE-A 100 24 624. The polyisocyanate compounds are used in an amount of from 0.1 to 20 wt. %, preferably from 0.5 to 10 wt. %, particularly preferably from 1.5 to 6 wt. %, based on the aqueous dispersion.

The films obtained from the aqueous polyurethane-polyurethane urea dispersions according to the invention are distinguished by low activation temperatures in the range from 40° to 80° C., very good initial heat resistances of ≤2 mm/min, preferably ≤1.5 mm/min, and high final heat resistances ≥90° C., preferably ≥100° C., particularly preferably ≥110° C. In addition, they exhibit excellent adhesion to a very wide variety of substrates such as, for example, wood, leather, textiles, various polyvinyl chloride grades (rigid, plasticised PVC), rubbers or polyethyl vinyl acetate.

The adhesive compositions comprising the dispersions according to the invention are suitable for bonding any desired substrates, such as, for example, paper, cardboard, wood, textiles, metal, leather or mineral materials. The adhesive compositions according to the invention are suitable in particular for the bonding of rubber materials, such as, for example, natural and synthetic rubbers, various plastics materials such as polyurethanes, polyvinyl acetate, polyvinyl chloride, in particular plasticised polyvinyl chloride. They are particularly preferably used for bonding soles made of these materials, preferably based on polyvinyl chloride, particularly preferably plasticised polyvinyl chloride, or based on polyethylvinyl acetate or polyurethane elastomeric foam, to shoe shafts of leather or synthetic leather. The adhesive compositions according to the invention are also particularly suitable for bonding films based on polyvinyl chloride or plasticised polyvinyl chloride to wood.

The adhesive compositions according to the invention are also suitable for use as primers.

The present application also provides adhesive composites containing substrates adhesively bonded using the polyurethane-polyurethane urea dispersions according to the invention.

The adhesive compositions according to the invention are processed by the known methods of adhesives technology in respect of the processing of aqueous dispersion adhesives.

EXAMPLES

The invention is explained in detail hereinbelow by means of the examples.

The initial heat resistance and the final heat resistance can be determined by the following methods:

A) Determination of the Initial Heat Resistance

The initial heat resistance test is carried out in one-component form (without a crosslinker).

Test Material/Test Specimen
a) Renolit film (32052096 Strukton; Rhenolit AG, 67547 Worms/Germany)
   Dimensions: 50×300×0.2 mm
b) Beech wood (planed)
   Dimensions: 50×140×40 mm Bonding and Measurement The test is carried out not earlier than 14 days after preparation of the adhesive dispersion. This is applied to the wood test specimen using a 200 μm knife. The bonding area is 50×110 mm. The drying time of the applied adhesive is at least 3 hours at room temperature. The two test specimens are then placed one above the other and joined for 10 seconds at 77° C. with a pressure of 4 bar. Immediately after, the test specimen is tempered for 3 minutes at 80° C. without a weight, and a 2.5 kg load is then applied perpendicularly to the glued joint for 5 minutes at 80° C. (180° peel). The amount by which the bond has detached is measured in millimetres. The initial heat resistance is given in mm/minute.

B) Determination of the Final Heat Resistance
1K adhesion: adhesive without crosslinker
2K adhesion: adhesive with an emulsifiable isocyanate crosslinker
3 parts of Desmodur® DN to 100 parts of adhesive are homogenised intensively.

Recommended weighed portion: 25 g of adhesive and 0.75 g of crosslinker

Test Material/Test Specimen
a) Rigid PVC covering film (Benelitfolie, Benecke-Kaliko AG, Hanover/Germany)
Dimensions: 50×210×0.4 mm
b) Beech wood (planed), dimensions: 50×140×40 mm Bonding and Measurement The adhesive dispersion (1K) or the mixture of adhesive dispersion and isocyanate crosslinker (2K) is applied to the beech wood test specimen using a brush. The bonding area is 50×110 mm. After a drying time of 30 minutes at room temperature, a second adhesive layer is applied over the first and then drying is carried out for 60 minutes at room temperature. The two test specimens are then placed one above the other and joined for 10 seconds at 90° C. with a pressure of 4 bar.

After storing the test specimens for three days at room temperature, a 0.5 kg load is applied to the test specimens at an angle of 180° relative to the bonded joint. The starting temperature is 50° C.; after 60 minutes the temperature is increased by 10° C. per hour to a maximum of 120° C. The temperature at which an adhesive bond separates completely is measured in each case.

Materials Used
Polyester I: 1,4-butanediol polyadipate diol of OH number=50
Polyester II: polyester diol of 1,6-hexanediol, neopentyl glycol and adipic acid of OH number=66
Polyether I: monofunctional, n-butanol-started, ethylene oxide-propylene oxide mixed polymer having an ethylene oxide content of 84%, of OH number=25
Desmodur® H: 1,6-hexamethylene diisocyanate (Bayer MaterialScience AG, Leverkusen/Germany)
Desmodur® I: isophorone diisocyanate (Bayer MaterialScience AG, Leverkusen/Germany)
Desmodur® DN: hydrophilic, aliphatic polyisocyanate based on hexamethylene diisocyanate (Bayer MaterialScience AG, Leverkusen/Germany)

Example 1

According to the Invention

A mixture of 450 g of polyester I, 42.51 g of polyester II and 5.58 g of polyether I is dewatered for 1 hour at 110° C. and 15 mbar. At 60° C., 2.25 g of 1,4-butanediol, 37.82 g of Desmodur® H and then 24.99 g of Desmodur® I are added. The mixture is stirred at 80° C. until a constant isocyanate content of 1.13% (which corresponds to 6.39 g of NCO or 0.15 mol of NCO) is achieved. The reaction mixture is dissolved in 778 g of acetone and thereby cooled to 50° C. A solution of 5.57 g of sodium salt of N-(2-aminoethyl)-2-aminoethanesulfonic acid (0.029 mol), 0.89 g of diethanolamine (0.009 mol) and 1.14 g of N-(2-hydroxyethyl)-ethylenediamine (0.011 mol) in 55 g of water is added to the homogeneous solution with vigorous stirring. After 30 minutes, dispersion is carried out by addition of 530 g of water. After separating off the acetone by distillation, a solvent-free, aqueous polyurethane-polyurea dispersion having a solids content of 40.1 wt. % and a mean particle size of the disperse phase, determined by laser correlation, of 175 nm is obtained. Mean amino functionality: 1.82

NCO groups/(amino+hydroxyl groups)=0.15/(0.089+0.029)=1.27

Example 2

According to the Invention

A mixture of 585 g of polyester I, 55.26 g of polyester II and 21.75 g of polyether I is dewatered for 1 hour at 110° C. and 15 mbar. At 60° C., 2.93 g of 1,4-butanediol, 49.16 g of Desmodur® H and then 32.49 g of Desmodur® I are added. The mixture is stirred at 80° C. until a constant isocyanate content of 1.16% (which corresponds to 8.66 g of NCO or 0.206 mol of NCO) is achieved. The reaction mixture is dissolved in 1031 g of acetone and thereby cooled to 50° C. A solution of 7.24 g of sodium salt of N-(2-aminoethyl)-2-aminoethanesulfonic acid (0.029 mol), 0.48 g of diethanolamine (0.005 mol) and 1.48 g of N-(2-hydroxyethyl)-ethylenediamine (0.014 mol) in 67 g of water is added to the homogeneous solution with vigorous stirring. After 30 minutes, dispersion is carried out by addition of 1087 g of water. After separating off the acetone by distillation, a solvent-free, aqueous polyurethane-polyurea dispersion having a solids content of 40.3 wt. % and a mean particle size of the disperse phase, determined by laser correlation, of 141 nm is obtained. Mean amino functionality: 1.90

NCO groups/(amino+hydroxyl groups)=0.206/
(0.091+0.024)=1.79

Example 3

According to the Invention

A mixture of 450 g of polyester 1 and 15 g of polyether I is dewatered for 1 hour at 110° C. and 15 mbar. At 60° C., 30.24 g of Desmodur® H and 19.98 g of Desmodur® I are added. The mixture is stirred at 80° C. until a constant isocyanate content of 0.98% (which corresponds to 5.05 g of NCO or 0.120 mol of NCO) is achieved. The reaction mixture is dissolved in 773 g of acetone and thereby cooled to 50° C. A solution of 5.85 g of sodium salt of N-(2-aminoethyl)-2-aminoethanesulfonic acid (0.031 mol), 0.42 g of diethanolamine (0.004 mol) and 1.11 g of N-(2-hydroxyethyl)-ethylenediamine (0.011 mol) in 73 g of water is added to the homogeneous solution with vigorous stirring. After 30 minutes, dispersion is carried out by addition of 730 g of water. After separating off the acetone by distillation, a solvent-free, aqueous polyurethane-polyurea dispersion having a solids content of 40.1 wt. % and a mean particle size of the disperse phase, determined by laser correlation, of 151 nm is obtained. Mean amino functionality: 1.91

NCO groups/(amino+hydroxyl groups)=0.120/
(0.088+0.019)=1.12

Example 4

Comparison

A mixture of 450 g of polyester I, 42.5 g of polyester II and 9.00 g of polyether I is dewatered for 1 hour at 110° C. and 15 mbar. At 60° C., 2.25 g of 1,4-butanediol, 37.81 g of Desmodur® H and then 24.98 g of Desmodur® I are added. The mixture is stirred at 80° C. until a constant isocyanate content of 1.02% (which corresponds to 5.78 g of NCO or 0.138 mol of NCO) is achieved. The reaction mixture is dissolved in 782 g of acetone and thereby cooled to 50° C. A solution of 6.25 g of sodium salt of N-(2-aminoethyl)-2-aminoethanesulfonic acid (0.033 mol), 1.24 g of ethanolamine (0.012 mol) and 1.23 g of N-(2-hydroxyethyl)-ethylenediamine (0.012 mol) in 85 g of water is added to the homogeneous solution with vigorous stirring. After 30 minutes, dispersion is carried out by addition of 504 g of water. After separating off the acetone by distillation, a solvent-free, aqueous polyurethane-polyurea dispersion having a solids content of 49.9 wt. % and a mean particle size of the disperse phase, determined by laser correlation, of 196 nm is obtained. Mean amino functionality: 1.79

NCO groups/(amino+hydroxyl groups)=0.138/
(0.102+0.036)=1.00

TABLE 1

Measurement of initial high-temperature stability and heat resistance

| | Initial high-temperature stability [mm/min] | Heat resistance 1K [° C.] | Heat resistance 2K [° C.] |
|---|---|---|---|
| Example 1 according to the invention | 1.2 | 110 | 120 |
| Example 2 according to the invention | 0.6 | 110 | 120 |
| Example 3 according to the invention | 0.4 | >120 | >120 |
| Example 4 comparison | 9.8 | 90 | >120 |

The films of Examples 1 to 3 obtained from the aqueous polyurethane-polyurethane urea dispersions according to the invention are distinguished, as compared with the comparison example, by very good initial high-temperature stabilities of from 0.4 to 1.2 mm/min and high heat resistances ≥110° C.

The invention claimed is:

1. An aqueous polyurethane-polyurethane urea dispersion comprising a reaction product of: (i) an NCO prepolymer prepared by reacting;
    (A) one or more di- or higher-functional polyols having a mean molecular weight of 400 to 5000 daltons, (B) optionally one or more di- or higher-functional polyol components having a molecular weight of from 62 to 399 daltons, (C) one or more compounds which are monofunctional within the scope of the isocyanate polyaddition reaction and have an ethylene oxide content of at least 50 wt.% and a molecular weight of at least 400 daltons, and (D) one or more di- or poly-isocyanate components; and
    (ii) a mixture (E) of primary and/or secondary monoamino compounds (E1) and primary and/or secondary diamino compounds (E2);
    wherein at least one of the amino compounds of the mixture (E) has at least one functional group bound thereto selected from the group consisting of sulfonates and carboxylates; wherein mixture (E) has a mean amino functionality of 1.65 to 1.98; and wherein the equivalent ratio of NCO groups in the NCO prepolymer to the total amount of isocyanate-reactive amino and hydroxyl groups of the mixture (E) is 1.04 to 1.9.

2. The aqueous polyurethane-polyurethane urea dispersion according to claim 1, wherein the one or more di- or poly-isocyanate components (C) comprises a mixture of hexamethylene diisocyanate and 1-isocyanato-3,3,5-trimethyl-5-isocyanatomethyl-cyclohexane.

3. The aqueous polyurethane-polyurethane urea dispersion according to claim 1, wherein component (E1) comprises a compound selected from the group consisting of diethylamine, ethanolamine, diethanolamine and mixtures thereof.

4. The aqueous polyurethane-polyurethane urea dispersion according to claim 1, wherein component (E2) comprises a compound selected from the group consisting of 1,2-ethanediamine, 1,6-hexamethylenediamine, 1-amino-3,3,5-trimethyl-5-aminomethyl-cyclohexane (isophoronediamine), piperazine, N-(2-hydroxyethyl)-ethylenediamine, N,N-bis(2-hydroxyethyl)-ethylenediamine, the sodium salt of N-(2-aminoethyl)-2-aminoethanesulfonic acid, the sodium salt of N-(2-amino-ethyl)-2-aminoethanecarboxylic acid and mixtures thereof.

5. A process for the preparation of the aqueous polyurethane-polyurethane urea dispersion according to claim 1, the process comprising: (i) providing a mixture of at least a portion of one or more of components (A), (B), (C) and (D), optionally in the presence of a solvent which is miscible with water but inert towards isocyanate groups, in a reactor; (ii) heating the mixture to a temperature of 50 to 120° C.; adding any remainder of components (A), (B), (C) and/or (D) not previously added to the reactor, to form the NCO prepolymer; and subsequently carrying out chain extension of the NCO prepolymer with the mixture (E) at a temperature of 15 to 60° C.; and, before, during or after the chain extension, conversion into the aqueous phase is carried out and the optional solvent is removed.

6. The process according to claim 5, wherein forming the NCO prepolymer is carried out with amounts of components (A), (B), (C) and (D) such that the NCO prepolymer has an isocyanate number of 1.05 to 2.5.

7. The process according to claim 5, wherein the isocyanate content of the NCO prepolymer is 0.3 to 3.0%.

8. The process according to claim 5, wherein no external emulsifiers are added.

9. An adhesive composition comprising an aqueous polyurethane-polyurethane urea dispersion according to claim 1 and a polyisocyanate compound having at least two isocyanate groups per molecule.

10. An adhesive composite comprising a substrate and an aqueous polyurethane-polyurethane urea dispersion according to claim 1.

11. The adhesive composite according to claim 10, wherein the substrate comprises a material selected from the group consisting of rubbers, plastics and combinations thereof.

12. The adhesive composite according to claim 10, wherein the substrate comprises a shoe sole and a shoe shaft.

13. The adhesive composite according to claim 10, wherein the substrate comprises films and wood.

* * * * *

UNITED STATES PATENT AND TRADEMARK OFFICE
CERTIFICATE OF CORRECTION

PATENT NO.       : 8,586,185 B2                            Page 1 of 1
APPLICATION NO.  : 12/741887
DATED            : November 19, 2013
INVENTOR(S)      : Harald Kraus et al.

It is certified that error appears in the above-identified patent and that said Letters Patent is hereby corrected as shown below:

In the Claims

At column 12, line 51, before the word "comprises," "(C)" should read "(D)."

Signed and Sealed this
Fourth Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,586,185 B2                                           Page 1 of 1
APPLICATION NO. : 12/741887
DATED            : November 19, 2013
INVENTOR(S)      : Kraus et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 470 days.

Signed and Sealed this
Twenty-second Day of September, 2015

Michelle K. Lee
*Director of the United States Patent and Trademark Office*